United States Patent
King et al.

(10) Patent No.: US 6,951,390 B2
(45) Date of Patent: Oct. 4, 2005

(54) PRINT MEDIA CARTRIDGE WITH INTEGRAL PRINT MEDIA AND INK SUPPLIES

(75) Inventors: Tobin Allen King, Balmain (AU); Silverbrook Kia, Balmain (AU)

(73) Assignee: Silverbrook Research PTY LTD, Balmain (AU)

( * ) Notice: Subject to any disclaimer, the term of this patent is extended or adjusted under 35 U.S.C. 154(b) by 0 days.

(21) Appl. No.: 10/659,016

(22) Filed: Sep. 11, 2003

(65) Prior Publication Data

US 2004/0090505 A1 May 13, 2004

Related U.S. Application Data

(63) Continuation of application No. 09/436,508, filed on Nov. 9, 1999, now Pat. No. 6,626,529.

(30) Foreign Application Priority Data

Sep. 11, 1998 (AU) .............................. PP7020

(51) Int. Cl.⁷ .............. B41J 2/01; B41J 3/00; B41J 2/175
(52) U.S. Cl. .............. 347/103; 347/2; 347/86; 347/104; 347/109
(58) Field of Search .............. 347/103, 104, 347/2, 86, 109

(56) References Cited

U.S. PATENT DOCUMENTS

| 2,506,035 | A | * | 5/1950 | Parker ................ 401/143 |
| 4,904,100 | A | * | 2/1990 | Enix .................. 400/613 |
| 5,240,238 | A | * | 8/1993 | Lee .................. 271/9.11 |
| 5,393,152 | A | | 2/1995 | Hattori et al. |
| 5,419,543 | A | | 5/1995 | Nakamura et al. |
| 5,462,375 | A | | 10/1995 | Isobe et al. |
| 5,493,409 | A | | 2/1996 | Maeda et al. |
| 5,559,932 | A | * | 9/1996 | Machida et al. ............. 358/1.5 |
| 5,608,437 | A | * | 3/1997 | Iwata et al. .................... 347/86 |
| 5,621,445 | A | * | 4/1997 | Fong et al. .................... 347/87 |
| 5,719,602 | A | | 2/1998 | Hackleman et al. |
| 5,971,533 | A | | 10/1999 | Kinoshita et al. |
| 5,971,641 | A | | 10/1999 | Looney |
| 6,056,286 | A | * | 5/2000 | Koga ..................... 271/145 |
| 6,149,256 | A | * | 11/2000 | McIntyre et al. .............. 347/2 |
| 6,270,271 | B1 | * | 8/2001 | Fujiwara ..................... 400/693 |
| 6,386,675 | B2 | * | 5/2002 | Wilson et al. ................. 347/19 |
| 6,454,375 | B2 | * | 9/2002 | Wilson et al. ................. 347/7 |
| 6,577,818 | B2 | * | 6/2003 | Hirano ....................... 396/30 |
| 6,626,529 | B1 | * | 9/2003 | King et al. .................. 347/104 |
| 6,719,415 | B1 | * | 4/2004 | Hattori et al. ................ 347/86 |
| 2002/0024570 | A1 | * | 2/2002 | Childers et al. .............. 347/85 |
| 2002/0047881 | A1 | * | 4/2002 | Lewis et al. .................. 347/85 |
| 2004/0207698 | A1 | * | 10/2004 | Katayama ..................... 347/86 |

FOREIGN PATENT DOCUMENTS

| JP | 09-113990 A | 5/1997 |
| WO | WO 97/04353 A | 2/1997 |
| WO | WO 94/50243 A | 12/1997 |

OTHER PUBLICATIONS

U.S. Appl. No. 10/436,508, King et al.

* cited by examiner

*Primary Examiner*—Andrew H. Hirshfeld
*Assistant Examiner*—Marvin P Crenshaw

(57) ABSTRACT

The present invention relates to a cartridge for use with a digital printing device. The cartridge includes a first casing portion for housing print media and a second casing portion for housing a supply of ink. The ink supply is formed by having the second casing portion segregated into distinct chambers for storing a supply of different colored inks, with each ink storage chamber having a corresponding ink outlet closed with a pierceable seal and is defined at least in part by a collapsible membrane.

7 Claims, 11 Drawing Sheets

PRINT MEDIA CARTRIDGE WITH INTEGRAL PRINT MEDIA AND INK SUPPLIES

CROSS REFERENCE TO RELATED APPLICATION

The present application is a continuation of U.S. application Ser. No. 09/436,508 filed Nov. 9, 1999, now issued as U.S. Pat. No. 6,626,529, the entire contents of which are herein incorporated by reference.

FIELD OF THE INVENTION

The present invention relates to print media supply cartridges for printers.

The invention has been developed primarily for use as a combined paper and ink supply cartridge and will be described hereinafter with reference to this particular preferred form. However, it will be appreciated that the inventive concept is applicable to all print media cartridges including those without an integral ink supply.

SUMMARY OF THE INVENTION

According to the invention there is provided a cartridge for use with a digital printing device the cartridge including:

a first casing portion for housing print media; and, a second casing portion for housing a supply of ink, the second casing portion being segregated into distinct chambers for storing a supply of different colored inks, each ink storage chamber having a corresponding ink outlet closed with a pierceable seal; wherein, each of the storage chambers is at least partially defined by respective collapsible membranes; such that, each of the storage chambers have ink storage volumes that reduce with ink usage.

In the preferred form, the cartridge includes a second storage portion for housing therein a supply of ink.

Desirably, the print media transport mechanism comprises a pick up roller assembly and more particularly includes:

a drive shaft;

pick up rollers secured to the drive shaft; and a drive gear, the shaft and rollers being captively supported within the casing.

Preferably the drive gear is positioned to be external to the casing to engage a powered corresponding gear provided on the printing device with which it is to be used. Alternatively an opening may be provided in the casing to facilitate this engagement with the powered gear of the printer device.

Preferably, the collapsible membrane that at least partially defines each of the distinct chambers is collapsible bladder. The bladder may be in the form of a fully flexible sealed bag within an external rigid casing. More preferably, the ink can be stored within a region defined on one side by a rigid portion of the casing to which has been sealed a collapsible membrane which defines the other side. Desirably, at least a portion of the rigid housing adjacent the side of the collapsible membrane or bag that is not in fluid communication with the ink, includes vent means to facilitate ingress of air to allow the membrane to collapse as the ink supply is consumed.

In the preferred form, the ink storage portion also includes one or more ink outlets each having a seal which is pierceable upon connection with the printing device. Desirably, these outlets are in the form of nozzle connections adapted for attachment with an ink distribution connection provided on the printer.

Preferably, the digital printing device is a drop-on-demand ink jet printing device.

BRIEF DESCRIPTION OF THE DRAWINGS

A preferred embodiment of the invention will now be described, by way of example only, with reference to the accompanying drawings in which.

DESCRIPTION OF PREFERRED AND OTHER EMBODIMENTS

Figure 1:
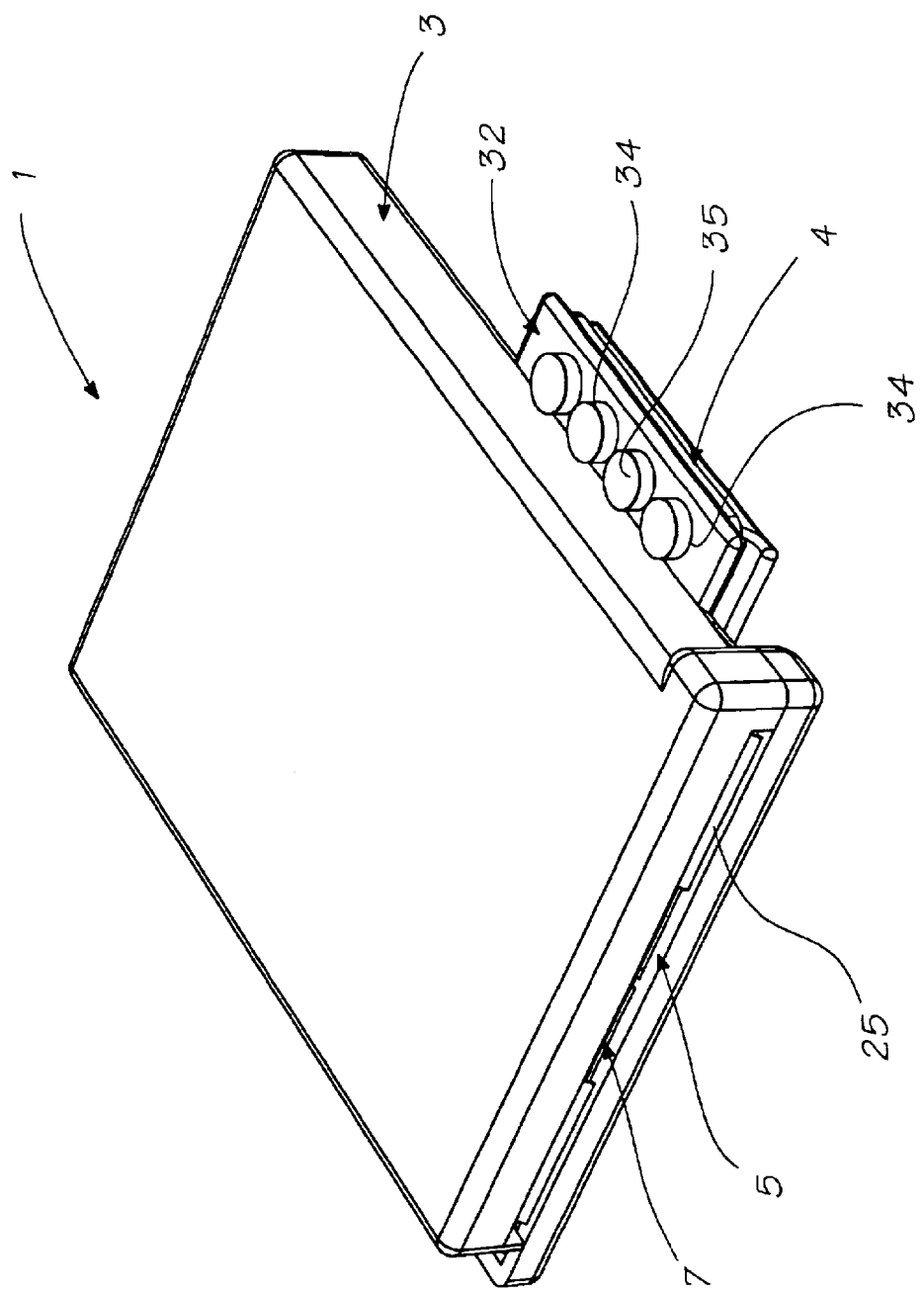
FIG. 1 is a top perspective view of a cartridge in accordance with the invention.
Figure 2:
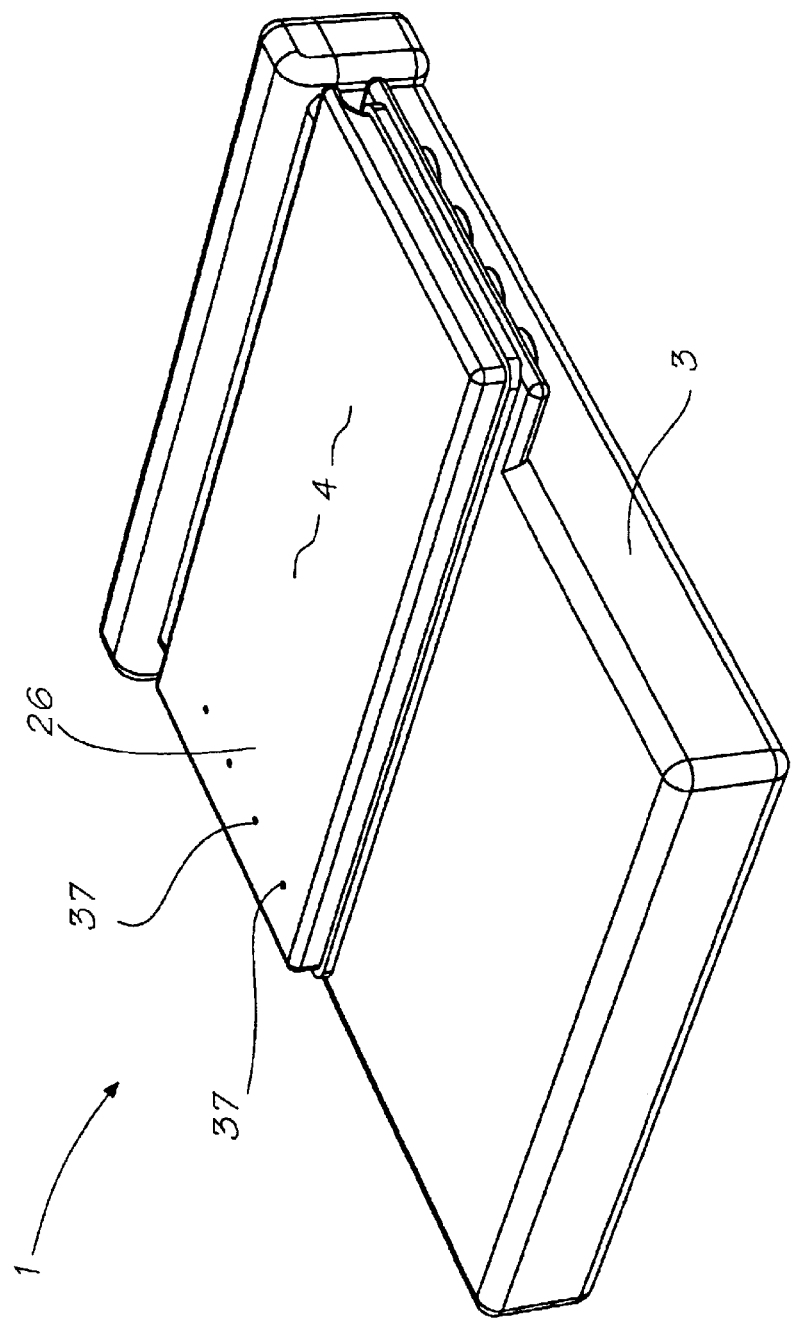
FIG. 2 is an inverted perspective view of the cartridge shown in FIG. 1.
Figure 3:
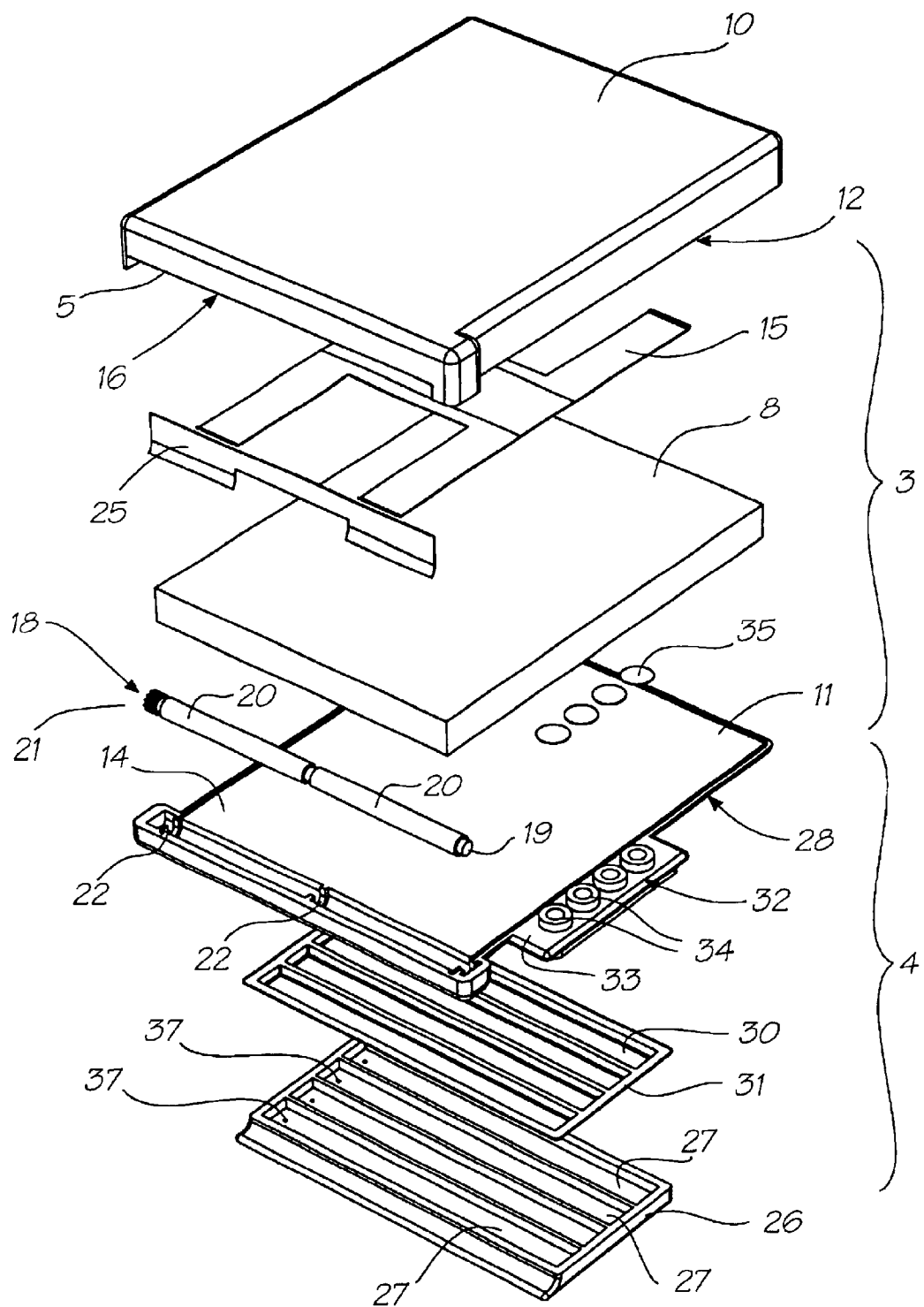
FIG. 3 is an exploded perspective top view shown in the same orientation as that shown in FIG. 1.
Figure 4:
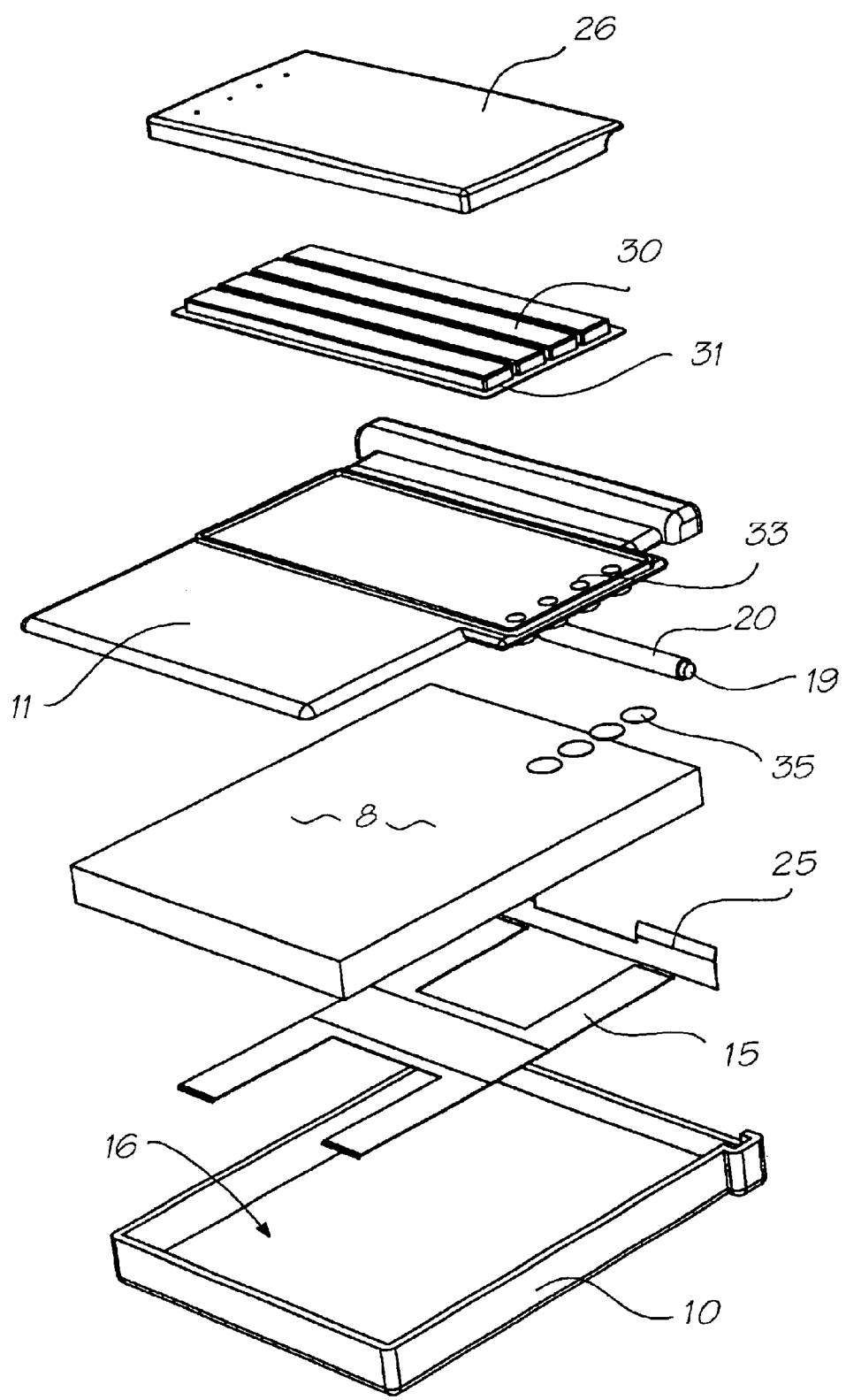
FIG. 4 is an exploded inverted perspective view shown in the same orientation as FIG. 2.
Figure 5:
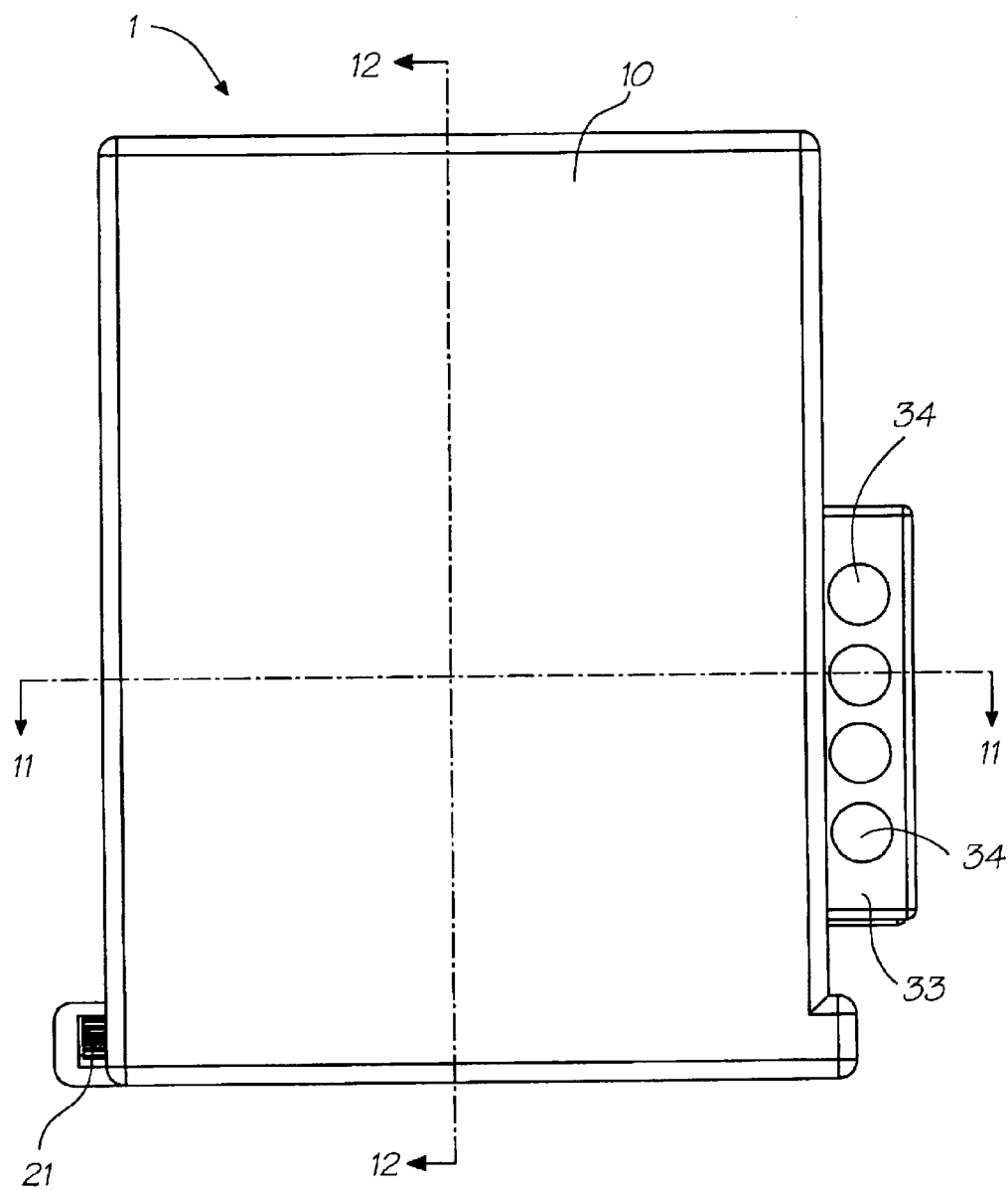
FIG. 5 is a top plan view of the cartridge of the previous figures.
Figure 6:
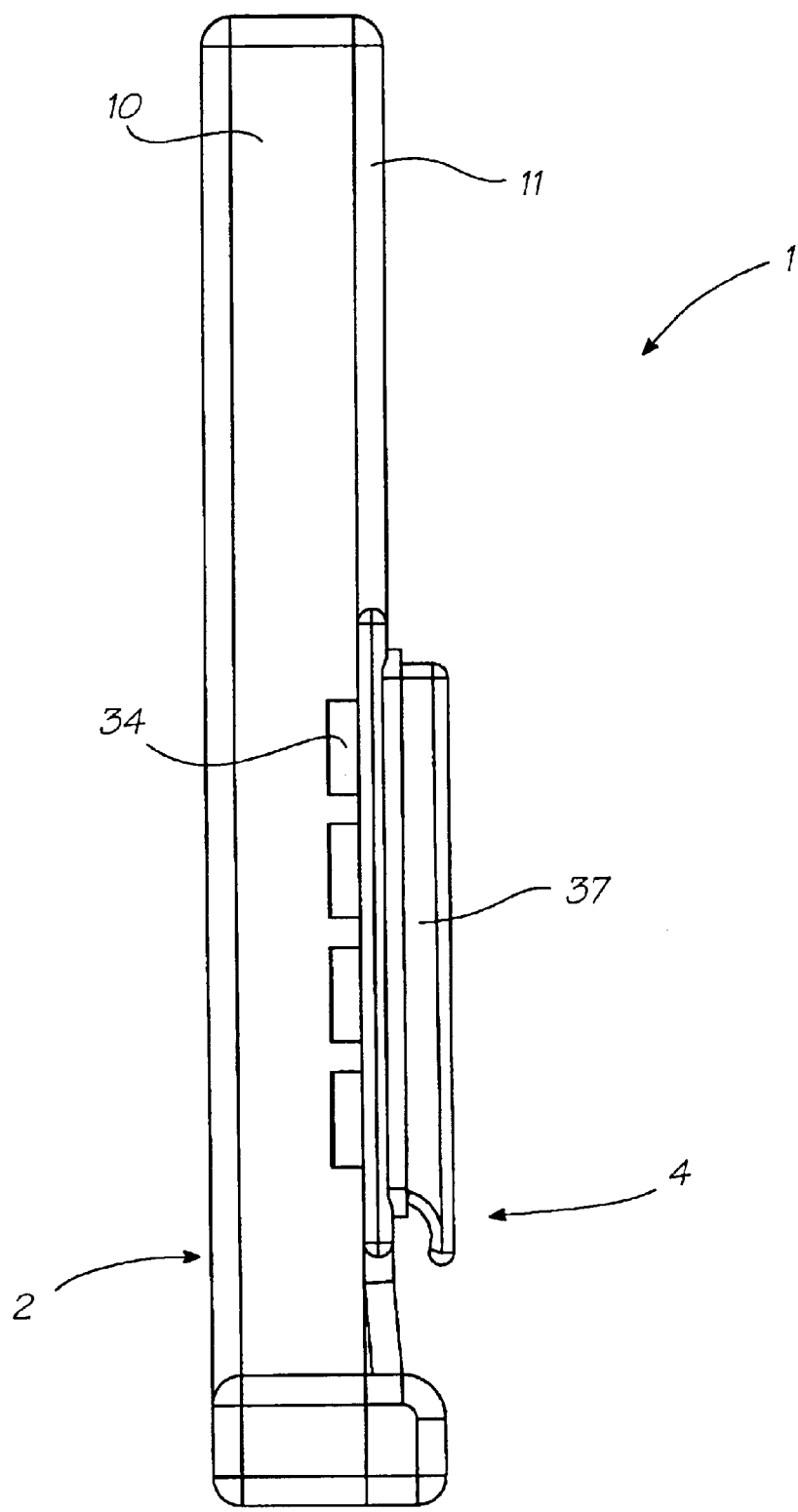
FIG. 6 is a right hand side view of the cartridge shown in FIG. 5.
Figure 7:
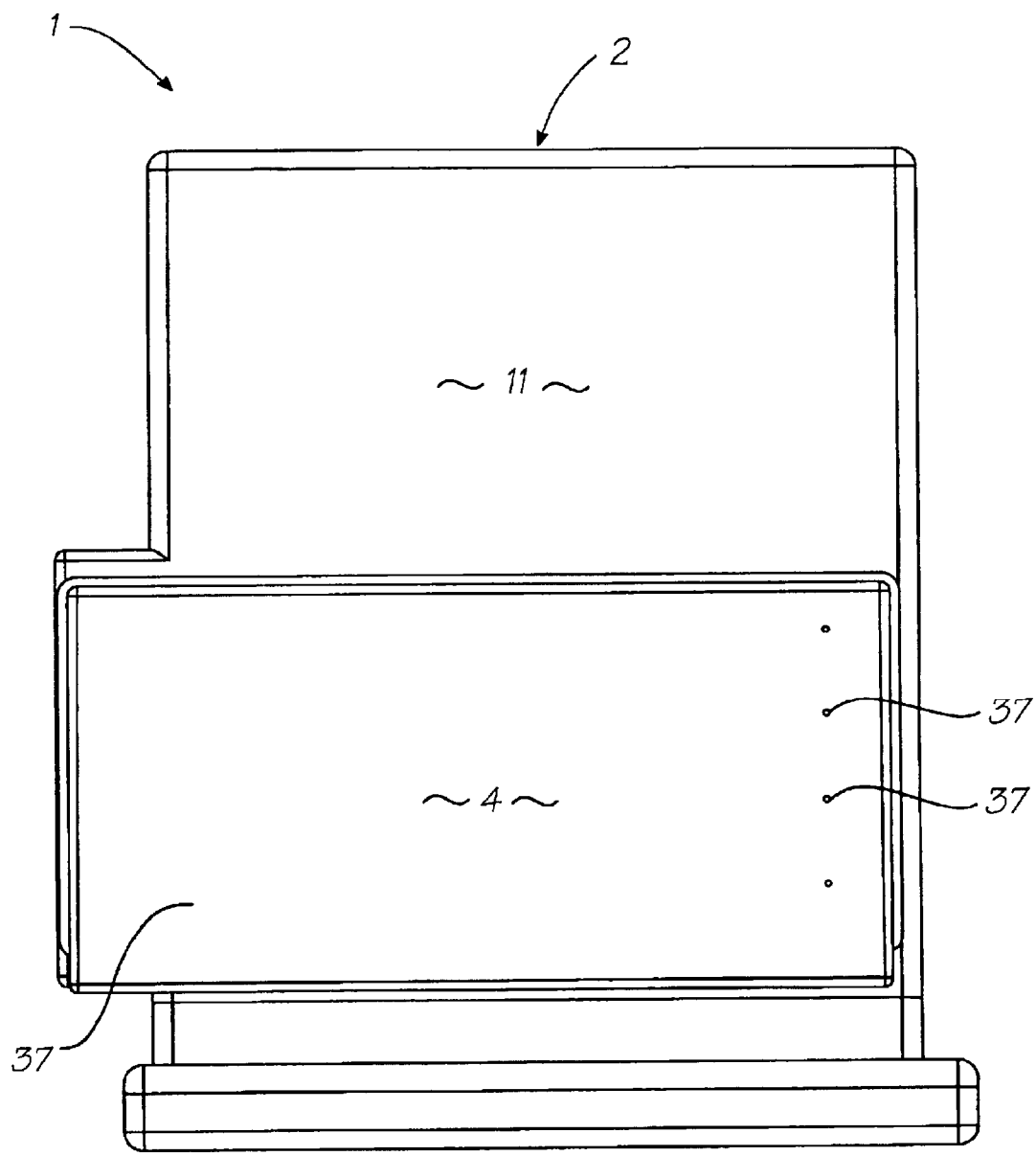
FIG. 7 is an inverted plan view of the cartridge of the previous figures.
Figure 8:
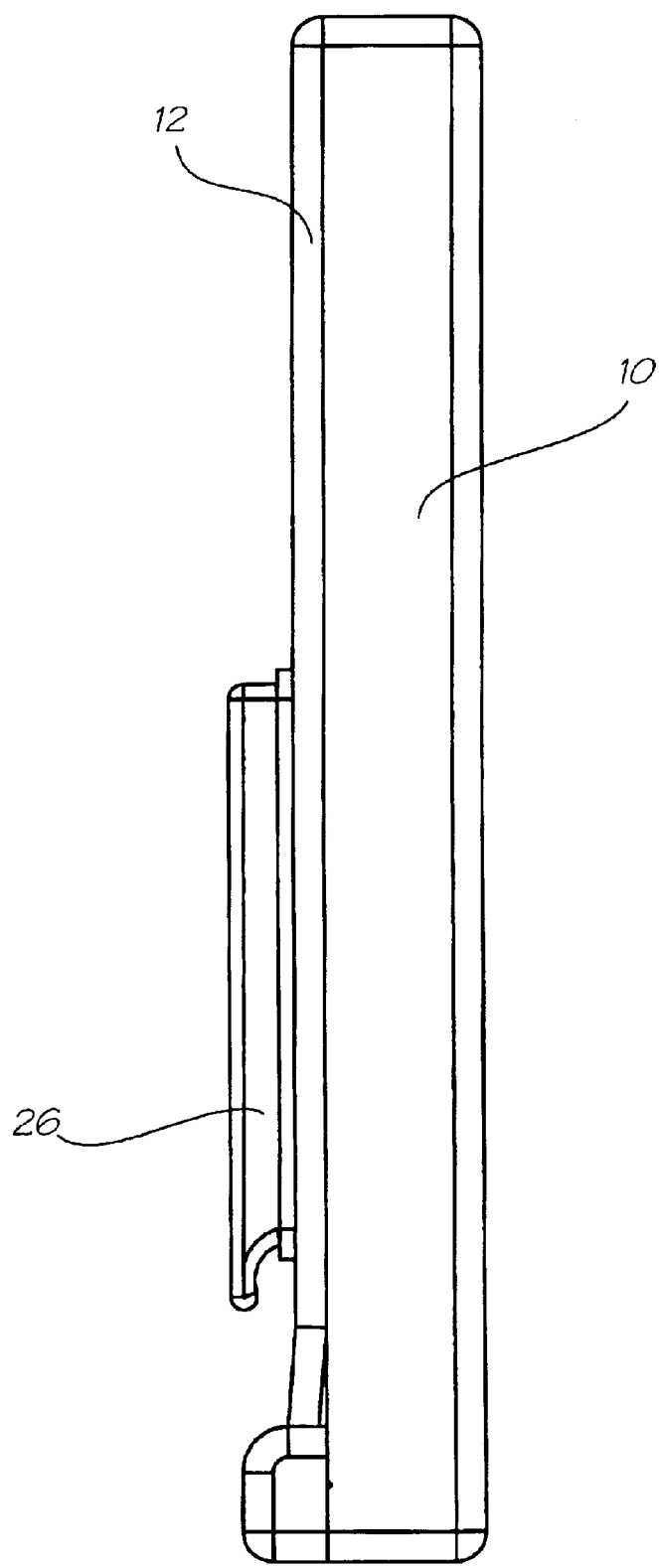
FIG. 8 is a left hand side view of the same cartridge.
Figure 9:
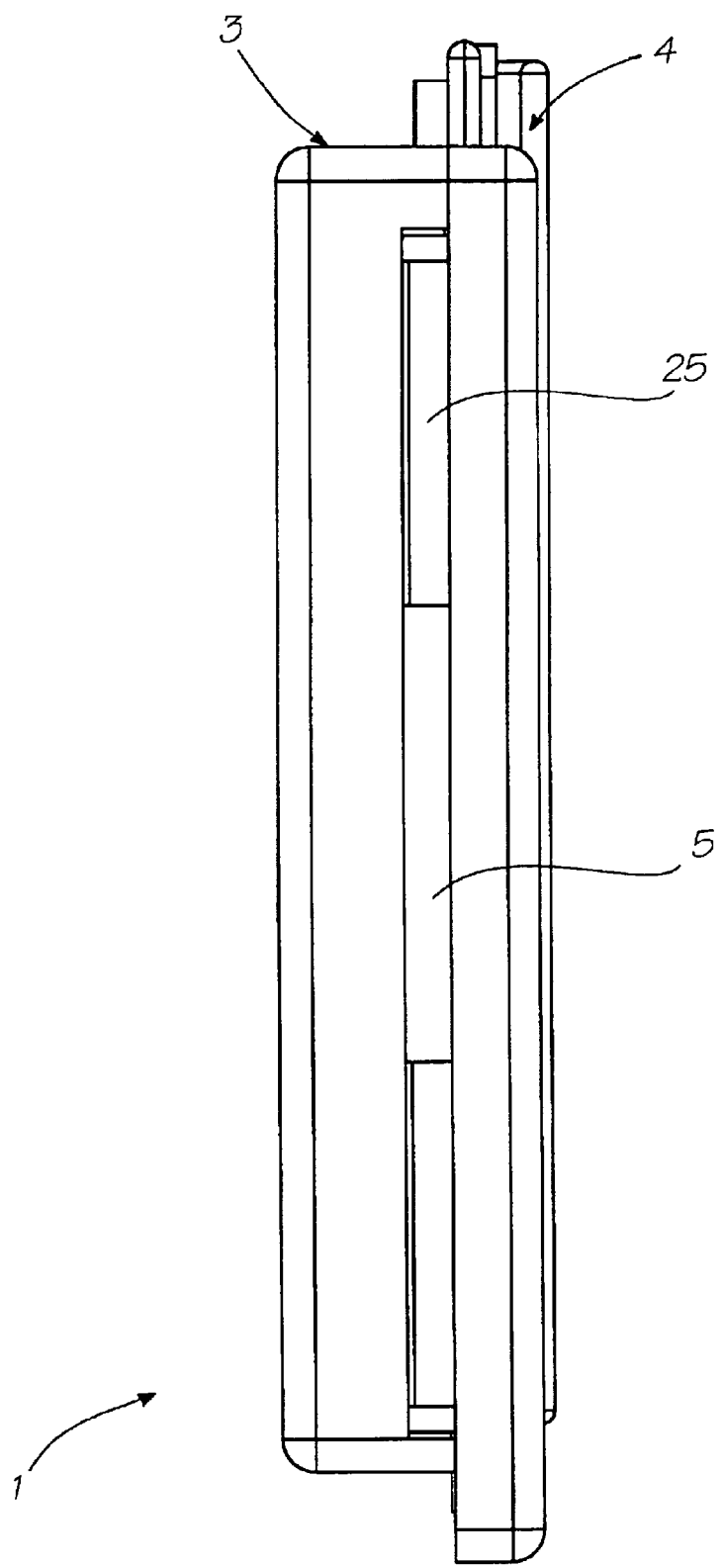
FIG. 9 is a front view of the same cartridge.
Figure 10:
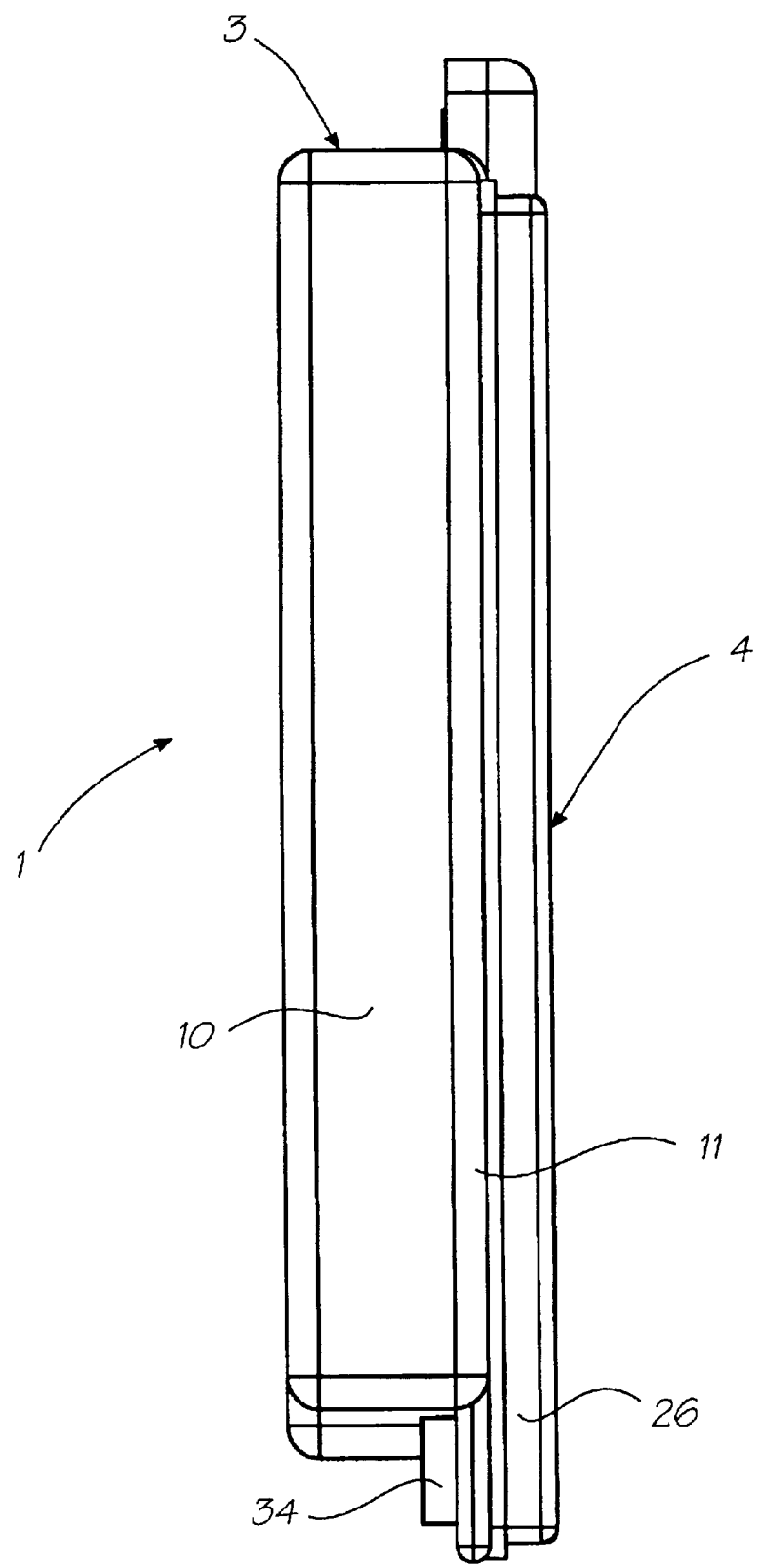
FIG. 10 is a rear view of the same cartridge.
Figure 11:
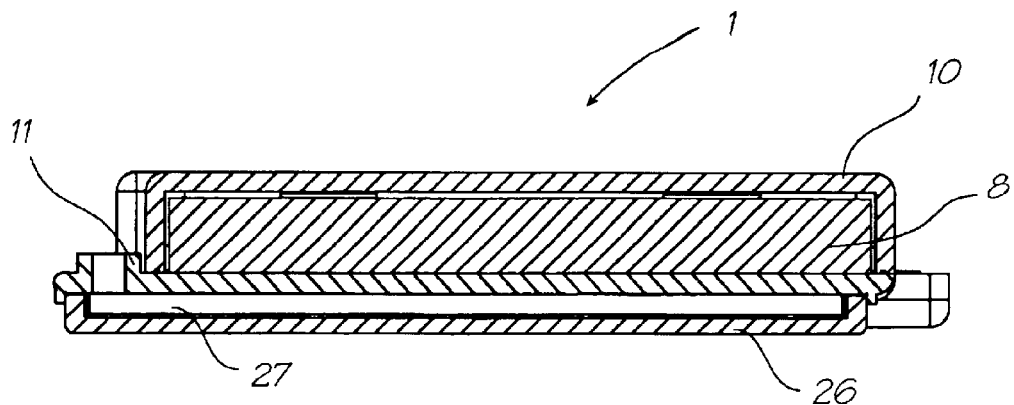
FIG. 11 is a sectional rear view taken on line 11—11 of FIG. 5.
Figure 12:
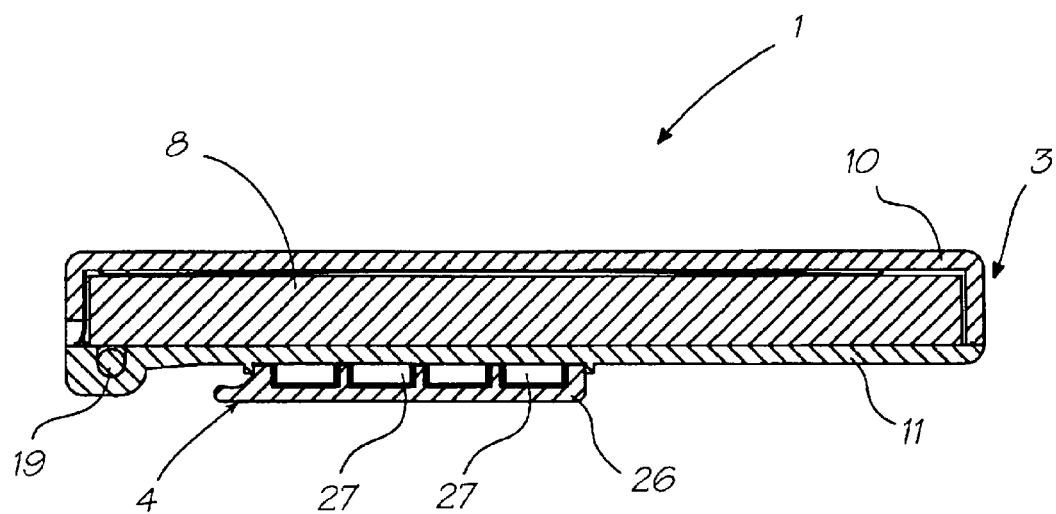
FIG. 12 is a sectional side view taken on line 12—12 of FIG. 5.

Referring to the drawings, there is shown a cartridge 1 for a printing device including a casing shown generally at 2. In the illustrated preferred form, the casing is divided into two main portions comprising, a print media supply portion 3 for housing sheets of paper and the like, and a second storage portion 4 for housing an ink supply. This cartridge is designed for use with digital printing devices, and is particularly suitable for drop-on-demand ink jet printing devices.

The casing 2 also defines a print media exit opening 5 that connects with the print media storage portion 3 and a print media transport mechanism shown generally at 7. This transport mechanism is disposed within the print media housing portion 3 adjacent the print media exit 5, such that upon operation it picks up and drives the print media 8 out through the print media exit opening.

Turning first to consider the elements of the print media storage portion of the cartridge, it can be seen to comprise a media top molding 10 which mates with a corresponding bottom molding 11. In this manner the moldings combine to define a generally rectangular print media storage region 12 in which is housed print media in the form of a stack of paper sheets or cards.

The top and bottom moldings 10 and 11 are both configured at a front end to define, in combination, the print media exit opening 5. In use, the stack of cards 8 are disposed within the storage region 12. These are biased downwardly toward engagement with an upper surface 14 of the bottom molding 11 by means of thin metal springs 15 which bear against an inner lower surface 16 of the top molding 10.

The print media transport mechanism of the preferred form illustrated is in the form of a geared pick up roller assembly 18. This assembly includes a drive shaft 19, pick up rollers 20 that are rigidly secured to the drive shaft, and an external drive gear 21.

The transport assembly 18 is captively retained within the casing portion formed by the top and bottom print media moldings, the drive shaft 19 being rotatably supported by means of arcuate ribs 22 formed in a channel 23 located beneath the exit opening 5. The top molding fully encloses the portion of the drive shaft holding the pick up rollers 20, but leaves the external drive gear 21 exposed as shown. In an alternate form, the drive gear may be accessed via an opening in the casing for engagement with a corresponding powered roller on the printer device. A plastic or metal foil 25 is also provided adjacent the exit opening 5. This foil is sized to extend downwardly across the exit such that once the transport mechanism is operated, only a single sheet of paper or card is driven through the exit at any one time.

The ink storage portion 4 is similarly defined by two separate moldings forming part of the cartridge casing. The primary molding is the ink storage base molding 26 which is configured to define a plurality of distinct ink chambers 27. Ultimately, the chambers are sealed by direct or indirect connection of this base molding 26 to a cover molding, which in this preferred form is provided by an underside 28 of the print media storage bottom molding 11.

In the preferred form shown, the connection of the two moldings is indirect, as there is provided an intermediate thin walled deformable film 30 which is preferably initially contoured to nest within the ink chambers 27 defined in the base molding 26. During assembly, the base molding 26 is sealingly connected with a flange 31 provided around the periphery of the thin walled deformable film 30 which in turn is sealingly connected with the underside 28 of the print media storage bottom molding 11.

As can be seen from the drawings, the ink chambers base molding 27 preferably extends beyond the peripheral edge of the print media storage region above, so as to define an ink supply connection manifold region 32. The upper portion of the manifold 32 is formed as an extension 33 of the print media storage bottom molding 11 and includes thereon a plurality of ink connection nozzles 34 which are closed by means of pierceable ink seals 35. In use the ink is stored above the deformable film and is thereby in fluid communication with the ink connection nozzles 34. In order to facilitate collapsing of the deformable film 30 as the ink is withdrawn, air vents 37 are provided in the ink storage base molding 26, preferably at the end remote from the ink nozzles. The various components of the cartridge casing can be assembled by any suitable means including use of adhesives, ultrasonic welding or mechanical fasteners or the like.

A preferred application of the cartridge of the invention as hereinbefore described is for use in a video games console having an integral printer of the kind described in Australian provisional patent application PP7020 and corresponding US application entitled "A video game console with integral printer device" filed concurrently herewith, the contents of which are incorporated herein by reference.

In use, the cartridge of the invention is inserted into an appropriately configured printer device whereby the drive gear 21 aligns with and engages a corresponding driven gear provided on the printer mechanism. The advantages of this configuration are numerous. Most importantly, the provision of the transportation means within the cartridge, ensures that the paper or other print media is fed out of the cartridge accurately and with minimum initial contamination, as the mechanism and print media are housed within an enclosed unit. In cartridges of the prior art, the cartridge is pressed onto a pick up roller mounted in the printer device, which exposes the paper on the underside. By contrast, the present design allows for greater structural integrity as there is no need to provide an opening that exposes the print media to that same extent. Further, the design provides for a tamper proof unit.

Additional advantages relating to the preferred forms include the provision of seals over the ink outlet nozzles that are pierceable automatically by the printer mechanism upon loading. In this regard, the cartridge is intended only as a single use product. Additionally, the structure of the ink chamber molding whereby the deformable film and base can be molded or joined in a simultaneous operation to form a completely sealed ink chamber, clearly offers manufacturing cost and efficiency advantages.

It will be appreciated by those skilled in the art that whilst the invention has been described with reference to a specific example, the concept can be embodied in many other forms. For example, the print media transport mechanism need not be limited to a pick up roller mechanism, but could include any other suitable mechanisms which can be externally driven from outside the cartridge casing. Similarly, the means of storage of the ink is not limited to the form described and could include the use of other deformable or non-deformable storage means. Accordingly, the preferred embodiment described should be considered in all respects to be illustrative and not restrictive.

We claim:

1. A cartridge for use with a digital printing device, the cartridge including:

a first casing portion for housing print media;

a second casing portion for housing a supply of ink, the second casing portion defining a part of each of a plurality of distinct chambers for storing a supply of different colored inks, each ink storage chamber having a corresponding ink outlet closed with a pierceable seal; and a deformable film sealingly connecting the first and second casing portions so as to define a remaining part of each of the storage chambers, wherein the deformable film is configured to provide each of the storage chambers with ink storage volumes that reduce with ink usage.

2. A cartridge device according to claim 1 wherein each ink outlet is in the form of a nozzle adapted to connect with a corresponding ink connection means provided on the printed device with which the cartridge is to be used.

3. A cartridge according to claim 1, the cartridge including a print media exit opening arranged in said first portion of the casing; and a transport assembly arranged at least partially within said first portion of the casing and being disposed upon operation to pick up and drive a sheet of said print media through said exit opening.

4. A cartridge according to claim 3 wherein said transport assembly includes:

a drive shaft, pick up rollers rigidly connected with said drive shaft; and a drive gear, said drive shaft and roller being captively supported within said first portion of the casing.

5. A cartridge according to claim 4 wherein the drive gear is adapted to engage a powered corresponding gear provided on the printing device with which the cartridge is to be used.

6. A cartridge according to claim 5 wherein the drive gear is able to engage a powered corresponding gear provided on the printing device by means of an aperture provided on said casing.

7. A cartridge according to claim 1 which includes a shielding means arranged in said first portion of the casing adjacent the exit opening for assisting in the supply of print media to said printing device.

* * * * *

UNITED STATES PATENT AND TRADEMARK OFFICE
CERTIFICATE OF CORRECTION

PATENT NO. : 6,951,390 B2
APPLICATION NO. : 10/659016
DATED : October 4, 2005
INVENTOR(S) : Tobin Allen King and Kia Silverbrook It is certified that error appears in the above-identified patent and that said Letters Patent is hereby corrected as shown below:

On the title page, item (75) should read as:

Item (75) Inventors: Tobin Allen King, Balmain (AU)
Kia Silverbrook, Balmain (AU)

Signed and Sealed this

Nineteenth Day of August, 2008

JON W. DUDAS
*Director of the United States Patent and Trademark Office*